United States Patent [19]

Miura et al.

[11] Patent Number: 4,959,733
[45] Date of Patent: Sep. 25, 1990

[54] MOTOR ROTATION CONTROL APPARATUS WITH MOTOR ROTATIONAL FREQUENCY MEMORY

[75] Inventors: Yoshio Miura; Motoyuki Suzuki; Akio Fukushima; Yonemitu Mori, all of Yokohama, Japan

[73] Assignee: Hitachi, Ltd., Tokyo, Japan

[21] Appl. No.: 194,303

[22] Filed: May 16, 1988

[30] Foreign Application Priority Data

May 18, 1987 [JP] Japan .................................. 62-118770

[51] Int. Cl.⁵ ............................................. H04N 5/76
[52] U.S. Cl. ................................. 358/338; 360/73.03
[58] Field of Search ............... 358/320, 321, 322, 337, 358/338, 342; 360/73, 36.1, 73.01, 73.03, 73.11, 73.12, 73.13; 369/50, 47, 48; 318/314, 318

[56] References Cited

U.S. PATENT DOCUMENTS

| 4,047,231 | 9/1977 | Garagnon | 358/338 |
| 4,223,349 | 9/1980 | Dakin et al. | 358/342 |
| 4,481,615 | 11/1984 | Hioki | 369/50 |
| 4,542,423 | 9/1985 | Kotake et al. | 358/342 |
| 4,638,375 | 1/1987 | Motoyama | 358/338 |

Primary Examiner—Robert L. Richardson
Attorney, Agent, or Firm—Antonelli, Terry, Stout & Kraus

[57] ABSTRACT

An apparatus for controlling the rotation of a motor to rotate a recording medium where an information signal and synchronizing signal are recorded. In such motor rotation control, normally the synchronizing signal reproduced from the recording medium is phase-compared with a reference synchronizing signal, and the motor rotation is so controlled as to eliminate the phase error between the two compared signals. And upon occurrence of any great variation in the motor rotation due to information dropout or the like on the recording medium, such variation is detected, and a rotational frequency signal obtained from a rotational frequency detector is phase-compared with a reference frequency signal generated on the basis of the data relative to the motor rotational frequency stored sequentially in a memory. Then the control mode is switched for controlling the motor rotation in such a manner as to eliminate the phase error between the two compared signals, whereby the problems including runaway of the motor and so forth can be solved.

20 Claims, 5 Drawing Sheets

FREQUENCY DISCRIPANCY $\delta_1$ (%)
FREQUENCY ERROR DETECTING SIGNAL (I)

FREQUENCY DISCRIPANCY $\delta_1$ (%)
FREQUENCY ERROR DETECTING SIGNAL (II)

FREQUENCY DISCRIPANCY $\delta_2$ (%)
ROTATIONAL FREQUENCY ERROR DETECTING SIGNAL FREQUENCY DISCRIPANCY $\delta_2$ (%)

FREQUENCY DISCRIPANCY $\delta_2$ (%)

MOTOR ROTATION CONTROL APPARATUS WITH MOTOR ROTATIONAL FREQUENCY MEMORY

BACKGROUND OF THE INVENTION

1. Field of the Invention

The present invention relates to an apparatus for controlling the rotation of a motor in a video disc player, a digital audio disc player or the like and, more particularly, to an apparatus adapted for use in reproduction of a rotary recording medium such as a video disc or digital audio disc where information is recorded substantially at a fixed linear density.

2. Description of the Prior Art:

As an apparatus employed for controlling the rotation of a disc driving motor in the conventional video disc player or digital audio disc player, there is known an example disclosed in U.S. Pat. No. 4,223,349 wherein a reproduced synchronizing signal is separated from the information (reproduced composite signal) obtained from the disc and is phase-compared with a reference synchronizing signal, and the rotation of the motor is controlled in accordance with the result of such comparison.

The term "synchronizing signal" in this specification corresponds to a horizontal synchronizing signal, a vertical synchronizing signal and so forth in a video disc player, or to a clock signal and so forth in a digital audio disc player. This definition applies to the following description as well.

However, in such motor rotation control apparatus mentioned, there are some problems including that, when any dropout of the information is existent on the disc surface or the reproduction spot is positioned in a non-recorded portion (generally termed "mirror surface"), it becomes impossible to obtain a stable reproduced synchronizing signal to consequently bring about great variation in the motor rotation rate or runaway of the motor.

LIST OF RELATED PRIOR ART

U.S. Pat. No. 4,532,561 patented July 30, 1985
U.S. Pat. No. 4,675,855 patented June 23, 1987
U.S. Ser. No. 100,234 filed Sept. 23, 1987
U.S. Ser. No. 109,315 filed Oct. 19, 1987

SUMMARY OF THE INVENTION

In an attempt to solve the above-described problems observed in the prior art, an object of the present invention resides in providing an improved motor rotation control apparatus which is capable of stabilizing the rotation of the motor continuously even when a stable reproduced synchronizing signal fails to be obtained from the disc.

According to the feature of the present invention, normally a synchronizing signal reproduced from a recording medium is phase-compared with a reference synchronizing signal, and the motor rotation is so controlled as to eliminate the phase error between the two compared signals. Meanwhile, upon occurrence of any great variation in the motor rotation, such variation is immediately detected, and a rotational frequency or rpm signal outputted from an rpm detecting means is phase-compared with a reference frequency signal generated on the basis of the data relative to the rotational frequency of the motor and stored sequentially in a memory means. And subsequently the motor rotation is so controlled as to eliminate the phase error between the two compared signals.

DETAILED DESCRIPTION OF THE PREFERRED EMBODIMENT

Hereinafter a preferred embodiment of the present invention will be described with reference to the accompanying drawings. It is to be understood that the following description is concerned with an exemplary case of using the present invention as an apparatus for controlling the rotation of a motor in a video disc player.

Figure 1:
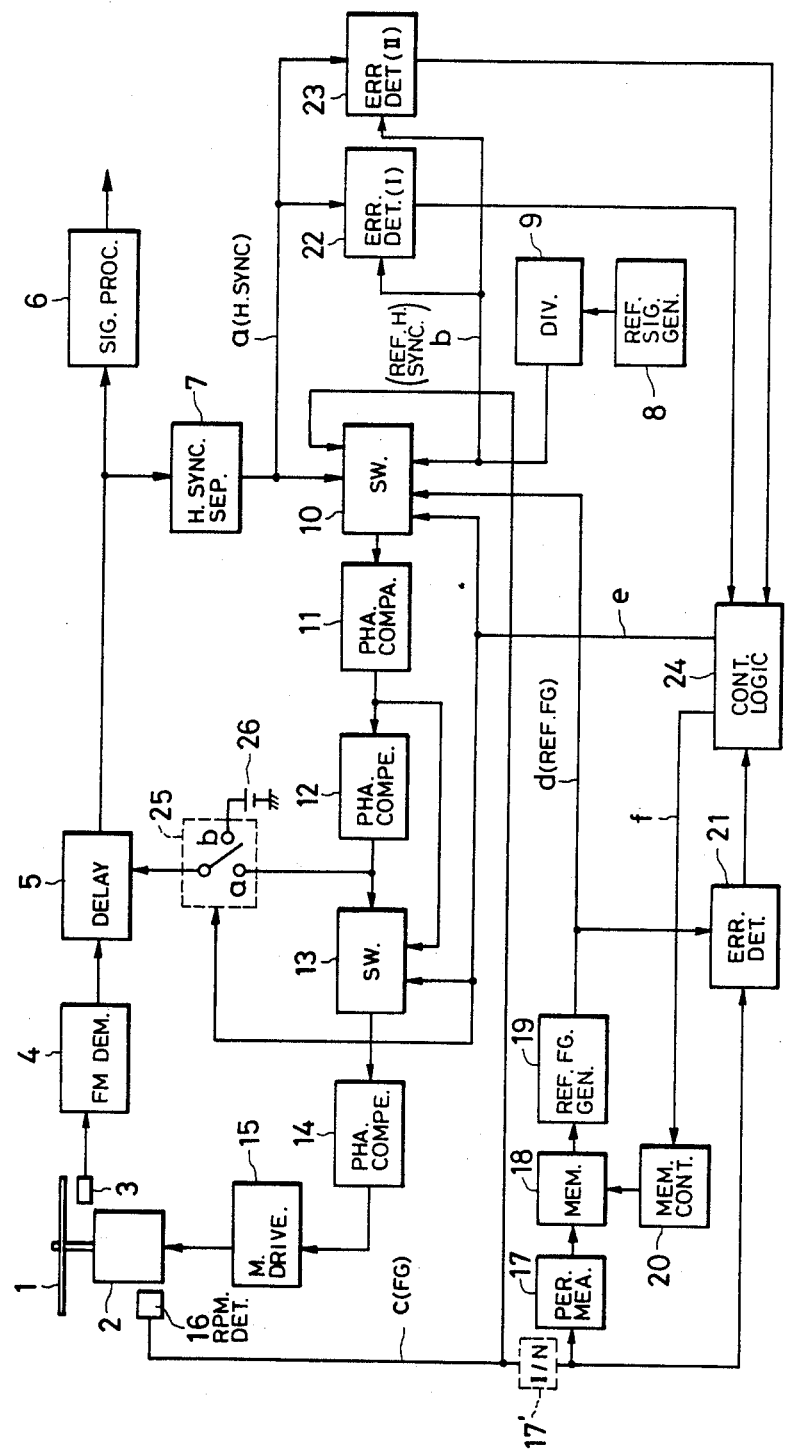
FIG. 1 is a block diagram of an embodiment according to the present invention.

FIG. 1 is a block diagram of a motor rotation control apparatus embodying the present invention.

In the diagram, there are shown a disc 1, a motor 2, a pickup 3, an FM demodulator 4, a variable delay circuit 5, a signal processing circuit 6, a horizontal synchronizing separator 7, a reference signal generator 8, a frequency divider 9, a switching circuit 10, a phase comparator 11, a phase compensator 12 for stabilizing a servo loop, a switching circuit 13, a phase compensator 14 for stabilizing the servo loop, a motor driving circuit 15, an rpm detector 16, a period measuring circuit 17 for measuring the period of an input signal, a memory circuit 18, a reference FG signal generator 19, a memory control circuit 20, a rotational frequency error detector 21, a first frequency error detector 22, a second frequency error detector 23, a control logic circuit 24, a switch 25, and a voltage source 26.

The signal read out from the disc 1 by the pickup 3 is first amplified by a preamplifier (not shown) and then is demodulated by the FM demodulator 4 to become a reproduced signal, which is subsequently fed via the variable delay circuit 5 to the signal processing circuit 6 where an output video signal is produced through required signal processing. Such reproduced signal is fed also to the horizontal synchronizing separator 7, where a horizontal synchronizing signal (H. Sync) (a) needed for servo control is separated from the reproduced signal. The horizontal synchronizing signal (a) thus separated is then inputted to the switching circuit 10, the first frequency error detector 22 and the second frequency error detector 23 respectively.

A reference horizontal synchronizing signal (Ref. H. Sync) (b) generated from the reference signal generator 8 and formed through the frequency divider 9 is inputted to the switching circuit 10, the first frequency error detector 22 and the second frequency error detector 23, respectively.

Meanwhile the rpm detector 16 detects the rpm or rotational frequency of the motor 2 and produces an output FG (Frequency Generator) signal (c) of a frequency proportional to the detected rpm. The FG signal (c) thus outputted is fed to the switching circuit 10, the period measuring circuit 17 and the rotational frequency error detector 21, respectively.

The period measuring circuit 17 measures the period of the input FG signal (c), and the period thus measured is written as data in the memory circuit 18 while being controlled by the memory control circuit 20. On the basis of the period data stored in the memory circuit 18, the reference FG signal generator 19 produces a reference FG (Ref. FG) signal (d) corresponding to the period data. The output Ref. FG signal (d) is then fed to the switching circuit 10 and the error detector 21, respectively. The operation of the memory control circuit 20 in this stage for controlling the memory circuit 18 will be described later in detail.

In the first frequency error detector 22 and the second frequency error detector 23, the horizontal synchronizing signal (a) inputted from the horizontal synchronizing separator 7 is compared with the reference horizontal synchronizing signal (b) inputted from the frequency divider 9, whereby the frequency discrepancy between the horizontal synchronizing signal (a) and the reference horizontal synchronizing signal (b) is detected. The detection characteristics of such two circuits 22 and 23 are graphically shown in FIGS. 2A and 2B, respectively.

Figure 2A:
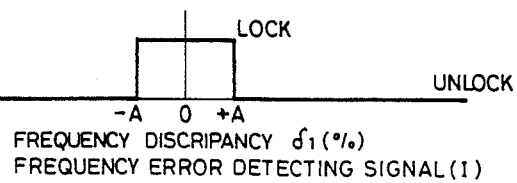
FIGS. 2A, 2B and 2C show the detection characteristics of a frequency error detector and a rotational frequency error detector employed in FIG. 1.
Figure 2B:
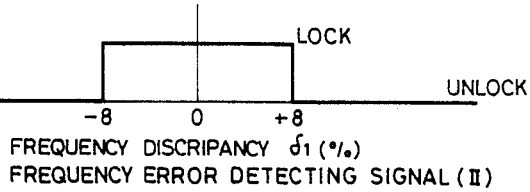

As shown in FIG. 2A, when the frequency discrepancy δ1 between the horizontal synchronizing signal (a) and the reference horizontal synchronizing signal (b) inputted from the frequency divider 9 has become below −A% or above +A%, the first frequency error detector 22 produces a low-level detection signal. Also as shown in FIG. 2B, when such frequency discrepancy δ1 has become below −B% or above +B%, the second frequency error detector 23 produces a low-level detection signal. The values of such A and B are so set as to be in a relationship of A<B.

Figure 2C:
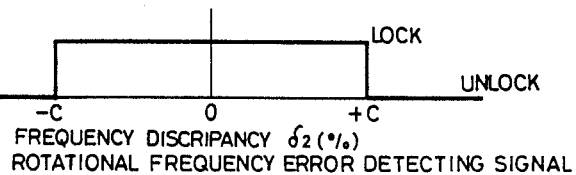

In the rotational frequency error detector 21, the FG signal (c) inputted from the rpm detector 16 is compared with the reference FG signal (d) inputted from the reference FG generator 19, whereby the frequency discrepancy between the FG signal (c) and the reference FG signal (d) is detected to consequently detect the rpm discrepancy of the motor 2. FIG. 2C graphically shows the detection characteristic of the circuit 21.

As shown in FIG. 2C, when the frequency discrepancy δ2 between the FG signal (c) and the reference FG signal (d) has become below −C% or above +C%, the circuit 21 produces a low-level detection signal. The value C thereof and the value B of the second frequency error detector 23 are so set as to be in a relationship of B<C.

The detection signals are fed to the control logic circuit 24 as shown in FIG. 1. On the basis of the respective output signals produced from the rotational frequency error detector 21 and the second frequency error detector 23, the control logic circuit 24 selects a servo system operation mode in accordance with the truth value table shown below and then produces a control signal (e) corresponding thereto.

| ROTATIONAL FREQUENCY ERROR DETECTION SIGNAL | FREQUENCY ERROR DETECTION SIGNAL (II) | MODE |
| --- | --- | --- |
| L | L | FG SERVO |
| L | H | LATCH |
| H | L | LATCH |
| H | H | H.SYNC SERVO |

L: UNLOCK
H: LOCK

As listed in the above table, a low-level control signal (e) is outputted in accordance with selection of FG servo mode when the detection signals from both the rotational frequency error detector 21 and the second frequency error detector 23 have a low level. Meanwhile, a high-level control signal (e) is outputted in accordance with selection of H. Sync servo mode when the detection signals from the two detectors have a high level.

In the above table, the term "latch" means an action to maintain the present operation mode without any switching. For example, in case the FG servo mode is selected with the low-level detection signals outputted from both the rotational frequency error detector 21 and the frequency error detector 23, if one of such two detection signals is turned to a high level, the present FG servo mode is maintained without being switched over to the H. Sync servo mode.

The control signal (e) outputted from the control logic circuit 24 is fed to the switching circuits 10, 13 and the switch 25 respectively so as to control the switching action in each of the circuits.

To the switching circuit 10 are fed the horizontal synchronizing signal (a), the reference horizontal synchronizing signal (b), the FG signal (c) and the reference FG signal (d) as mentioned previously. When the control signal (e) has a high level, for example, the horizontal synchronizing signal (a) and the reference horizontal synchronizing signal (b) are inputted to the phase comparator 11. In case the control signal (e) has a low level, the FG signal (c) and the reference FG signal (d) are fed to the phase comparator 11. Then the comparator 11 detects the phase difference between the two input signals and produces a phase error signal corresponding to such phase difference.

Subsequently the phase error signal obtained from the phase comparator 11 is fed to the switching circuit 13 either directly or through the phase compensator 12. In the switching circuit 13, the switching action is controlled by the control signal (e) as mentioned previously and, when the control signal (e) has a low level, the phase error signal fed directly from the phase comparator 11 is outputted. Meanwhile, in case the control signal (e) has a high level, the phase error signal fed through the phase compensator 12 is outputted.

The phase error signal outputted from the switching circuit 13 is then fed to the motor driving circuit 15 via the phase compensator 14 so as to control the rotation of the motor 2 for continuously stabilizing the rpm or rotational frequency thereof.

In the manner mentioned above, when the H. Sync servo mode is selected with the control signal (e) turned to a high level in the control logic circuit 24, servo control is effected by the reproduced horizontal synchronizing signal; and when the FG servo mode is selected with the control signal (e) turned to a low level, servo control is effected by the FG signal.

Meanwhile the phase error signal obtained through the phase compensator 12 is fed also to the terminal a of the switch 25, whose action is controlled by the control signal (e) as mentioned previously so that the terminal a is selected when the control signal (e) has a high level or the terminal b is selected in the case of a low level. And the output of the switch 25 is fed to the variable delay circuit 5 which comprises a CCD (charge coupled device) and so forth.

Therefore, when the control signal (e) has a high level and the operation is in the H. Sync servo mode, the delay of the variable delay circuit 5 is controlled by the phase error signal from the phase comparator 12 to correct the time base of the reproduced signal inputted from the FM demodulator 4. Thus, the high-frequency component can be corrected out of the time base error which is not absorbable completely by controlling merely the rotation of the motor 2.

When the control signal (e) has a low level and the operation is in the FG servo mode, the switch 25 is so actuated as to select the terminal b so that a required voltage from the voltage source 26 is applied to the variable delay circuit 5. This switching action is executed to prevent malfunction of the variable delay circuit 5 in the FG servo mode.

Meanwhile the detection signal outputted from the first frequency error detector 22 is fed as a memory control signal (f) via the control logic circuit 24 to the memory control circuit 20. When the output detection signal of the first frequency error detector 22 has a high level, the memory control signal (f) is turned also to a high level state; and in case such detection signal has a low level, the memory control signal (f) is turned also to a low level state. And the memory control circuit 20 serves to control renewal of the data in the memory circuit 18 merely during the high level state of the memory control signal (f).

Now a description will be given on the entire operation performed in the motor rotation control apparatus of FIG. 1.

In the initial stage of starting the rotation of the disc 1, the rotation of the motor 2 is so controlled as to be accelerated by a system control circuit (not shown). The frequency difference or discrepancy ⊕1 between the horizontal synchronizing signal (a) outputted from the horizontal synchronizing separator 7 and the reference synchronizing signal (b) from the frequency divider 9 is reduced in accordance with increase of the rotation rate of the disc 1 up to its predetermined normal value.

Upon reduction of such frequency discrepancy into a range of $-B\%$ to $+B\%$ shown in FIG. 2B, a high-level detection signal is outputted from the second frequency error detector 23; and upon reduction thereof into a range of $-A\%$ to $+A\%$ shown in FIG. 2A, a high-level detection signal is outputted from the first frequency error detector 22.

When the high-level detection signal is outputted from the first frequency control error detector 22, the period data corresponding to the latest motor rpm fed from the period measuring circuit 17 is written in the memory circuit 18, so that the FG signal (c) outputted from the rpm detector 16 is rendered substantially equal to the reference FG signal (d) outputted from the reference FG generator 19.

Accordingly the detection signal outputted from the rotational frequency error detector 21 is turned to a high level, and simultaneously a high-level control signal (e) is outputted from the control logic circuit 24. Then the switching circuits 10, 13 and the switch 25 are actuated in accordance with the truth value table mentioned above, whereby the servo system is placed in the H. Sync servo mode using the reproduced horizontal synchronizing signal (a).

The reproduced horizontal synchronizing signal (a) is phase-compared with the reference horizontal synchronizing signal (b) in the phase comparator 11, and the phase error signal obtained as the result of such comparison is fed via the phase compensator 12 and the switch 25 to the variable delay circuit 5 as described previously while being fed also to the motor driving circuit 15 via the switching circuit 13 and the phase compensator 14, thereby effecting feedback control of the motor 2 and the variable delay circuit 5 in accordance with the amount of variation in the reproduced horizontal synchronizing signal (a).

However, the horizontal synchronizing signal (a) fails to be reproduced properly if there exists any signal dropout due to defect of the disc, or when the reproduction spot is positioned on the mirror surface where no information is recorded, or when the pickup 3 is moved quickly in the radial direction of the disc in a state where a tracking servo (not shown) is at a stopped position for random access. Consequently the phase comparator 11 comes to produce an erroneous result of phase comparison to eventually cause variation in the rotational frequency of the motor 2.

When such variation in the rotational frequency of the motor 2 has exceeded the respective detection ranges of the second frequency error detector 23 and the rotational frequency error detector 21, the high-level control signal (e) outputted from the control logic circuit 24 as mentioned previously is turned to a low level, so that the switching circuits 10, 13 and the switch 25 are actuated to select the FG servo mode using the FG signal (c) obtained from the rpm detector 16.

In this stage, the FG signal (c) is phase-compared by the comparator 11 with the reference FG signal (d) outputted from the reference FG signal generator 19, and the phase error signal obtained as the result of such comparison is fed via the phase compensator 14 to the motor driving circuit 15 for controlling the rotation of the motor 2.

Since the detection range of the first frequency error detector 22 is preset to be narrower than that of the second frequency error detector 23, in case the rpm or rotational frequency of the motor 2 has any discrepancy greater than a predetermined value, renewal of the data in the memory circuit 18 is halted before the high-level control signal (e) is turned to a low level by the detection signal obtained from the first frequency error detector 22.

Consequently the frequency of the reference FG signal (d) outputted from the reference FG generator 19 is rendered substantially equal to the frequency of the FG signal (c) obtained when the rpm of the motor 2 is substantially normal. Accordingly the motor 2 is so controlled as to resume the former normal rpm or rotational frequency.

After the former rpm of the motor 2 is thus resumed to be within the detection ranges of the first and second frequency error detectors 22, 23 and the rotational frequency error detector 21, the operation is automatically switched to the H. Sync servo mode using the reproduced horizontal synchronizing signal (a). Therefore automatic resumption of the normal state is rendered possible while the motor 2 is retained free from runaway and the time required for recovery is shortened.

Figure 3:
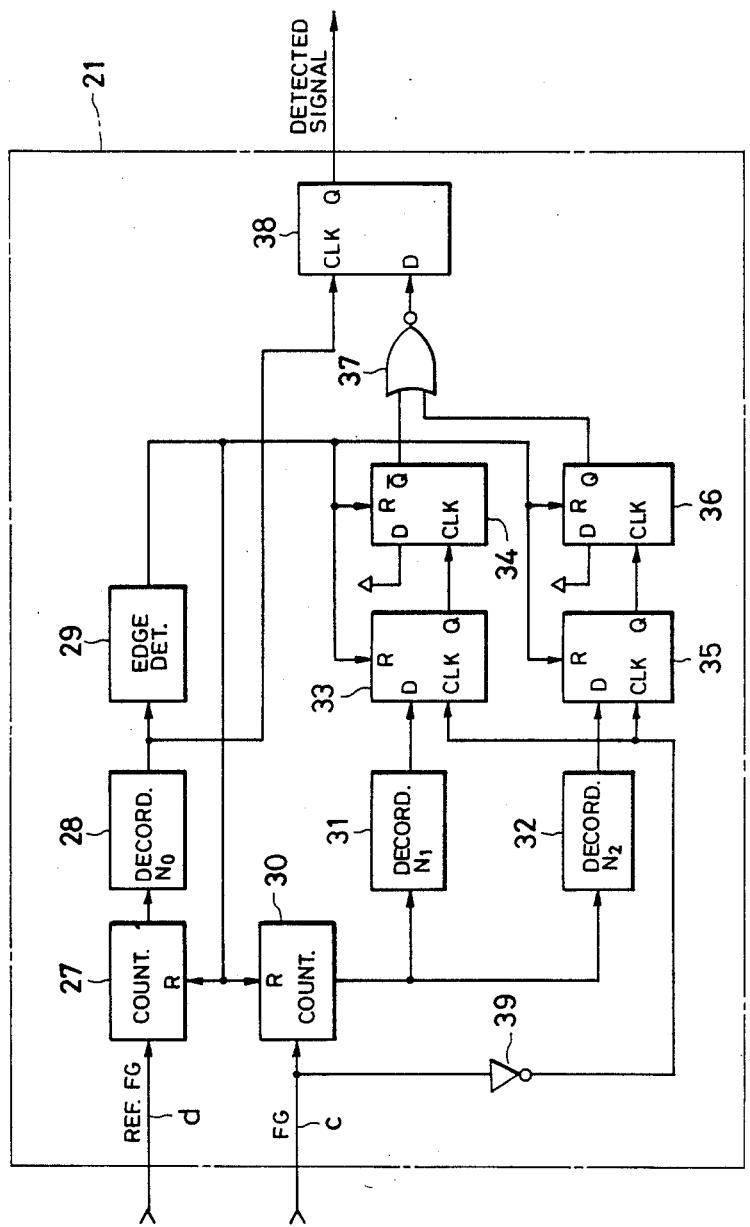
FIG. 3 is a block diagram of an exemplary rotational frequency error detector in FIG. 1.

FIG. 3 is a block diagram of an exemplary circuit configuration of the rotational frequency error detector 21 employed in FIG. 1.

In the circuit configuration shown in FIG. 3, first a counter 27 counts the reference FG signal (d) outputted from the reference FG signal generator 19, and a decoder 28 checks whether the counted value has reached a preset numerical value $N_0$. In the meantime a counter 30 counts the FG signal (c) outputted from the rpm detector 16, and a decoder 31 checks whether the counted value has reached a preset numerical value $N_1$, while another decoder 32 also checks whether the counted value has reached another preset numerical value $N_2$.

In order to achieve the characteristics graphically shown in FIG. 2C, the numerical values $N_0$, $N_1$ and $N_2$ are so selectively set as to satisfy the following conditions:

$$N_1 < N_0 < N_2$$

$$\frac{|N_0 - N_1|}{N_0} \times 100 = C\ (\%)$$

$$\frac{|N_0 - N_2|}{N_0} \times 100 = C\ (\%)$$

The outputs of the decoders 31 and 32 are fed to latch circuits comprising D type flip-flops 33, 34 and D type flip-flops 35, 36, respectively. Thereafter the $\overline{Q}$ output of the D type flip-flop 34 and the Q output of the D type flip-flop 36 are fed to a NOR gate 37, whose output is then fed to a D terminal of the D type flip-flop 38. Meanwhile the output of the decoder 28 is fed to a clock (CLK) terminal of the D type flip-flop 38. Therefore, if the counted FG signal (c) is between the preset numerical values $N_1$ and $N_2$ when the counted reference FG signal (d) has reached the preset value $N_0$, a high-level signal is produced from the Q output of the D type flip-flop 38; and if the counted FG signal (c) is greater than $N_2$ or smaller than $N_1$, a low-level signal is produced from the Q output. Consequently the Q output of the D type flip-flop 38 can serve as a detection signal of the rotational frequency error detector 21. Furthermore, the output of the decoder 28 is detected by an edge detector 29 to reset the individual circuits.

Since each of the first and second frequency error detectors 22 and 23 in FIG. 1 can be realized by a similar constitution, a repeated explanation is omitted here.

Figure 5:
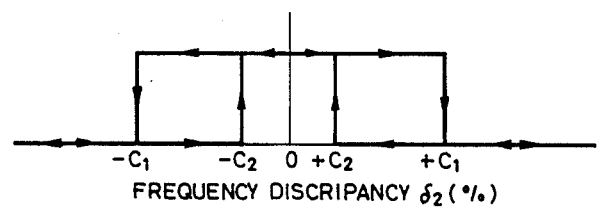
FIG. 5 shows the detection characteristics of the rotational frequency error detector in FIG. 4.
Figure 4:
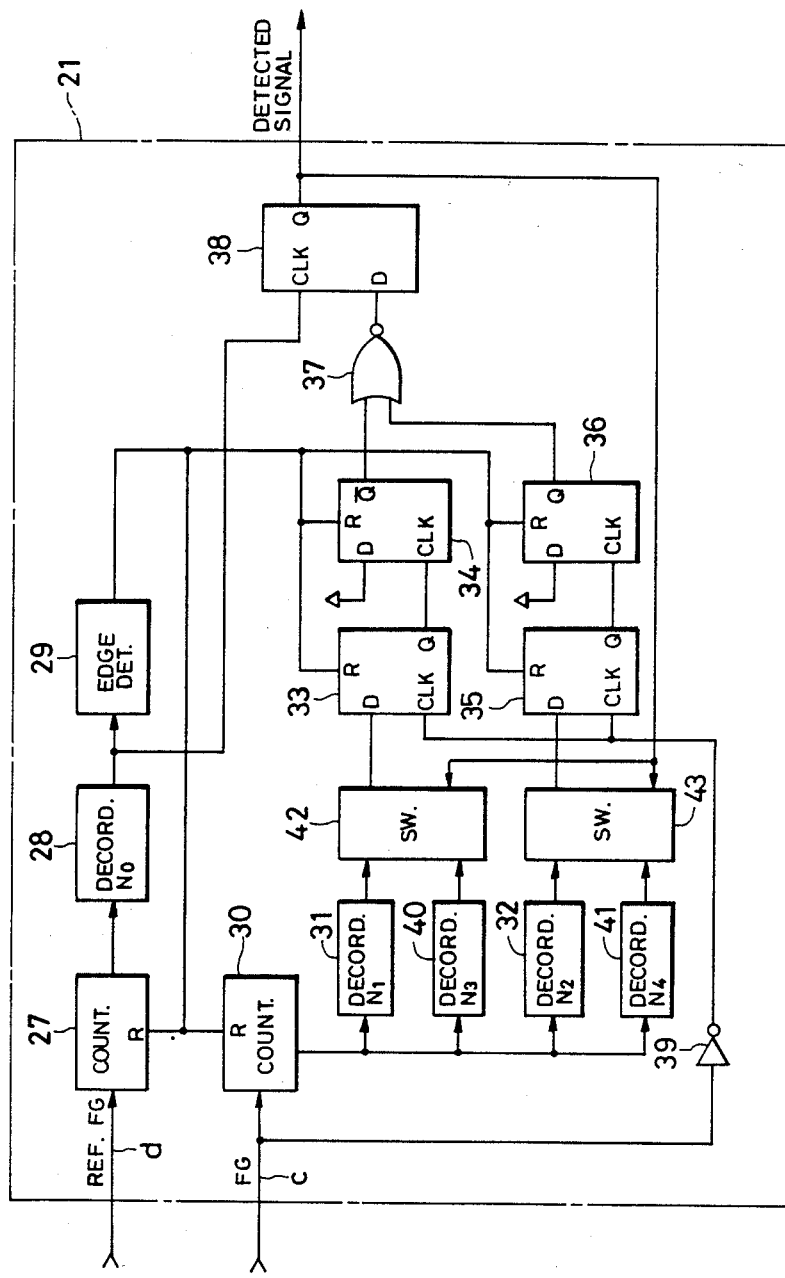
FIG. 4 is a block diagram of another exemplary rotational frequency error detector in FIG. 1.

FIG. 4 is a block diagram of another exemplary circuit configuration of the rotational frequency error detector 21 in FIG. 1, and FIG. 5 graphically shows the detection characteristic of the error detector 21 in FIG. 4.

The difference from the foregoing example of FIG. 3 resides in additional provision of decoders 40, 41 and switching circuits 42, 43 and further in inclusion of the hysteresis characteristic of FIG. 5 in the detection characteristics.

According to the above feature, the operation of the servo system is shifted from the H. Sync servo mode to the FG servo mode when the frequency discrepancy δ2 of the FG signal (c) from the reference FG signal (d) has varied below −C1% or above +C1%, or such servo system operation is shifted from the FG servo mode to the H. Sync servo mode when the frequency discrepancy δ2 has varied above −C2% or below +C2%. In this arrangement, there is achievable an advantage of prompt pull-in upon shift of the servo system operation from the FG servo mode to the H. Sync servo mode. The respective preset values of the decoders are so selected as to satisfy the following conditions:

$$N_1 < N_3 < N_0 < N_4 < N_2$$

$$\frac{|N_3 - N_0|}{N_0} \times 100 = C_2\ (\%)$$

$$\frac{|N_4 - N_0|}{N_0} \times 100 = C_2\ (\%)$$

$$\frac{|N_1 - N_0|}{N_0} \times 100 = C_1\ (\%)$$

$$\frac{|N_2 - N_0|}{N_0} \times 100 = C_1\ (\%)$$

Figure 7:
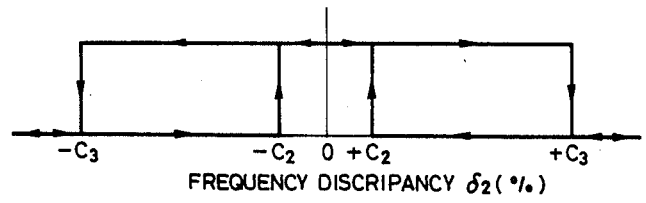
FIG. 7 shows the detection characteristics of the rotational frequency error detector in FIG. 6.
Figure 6:
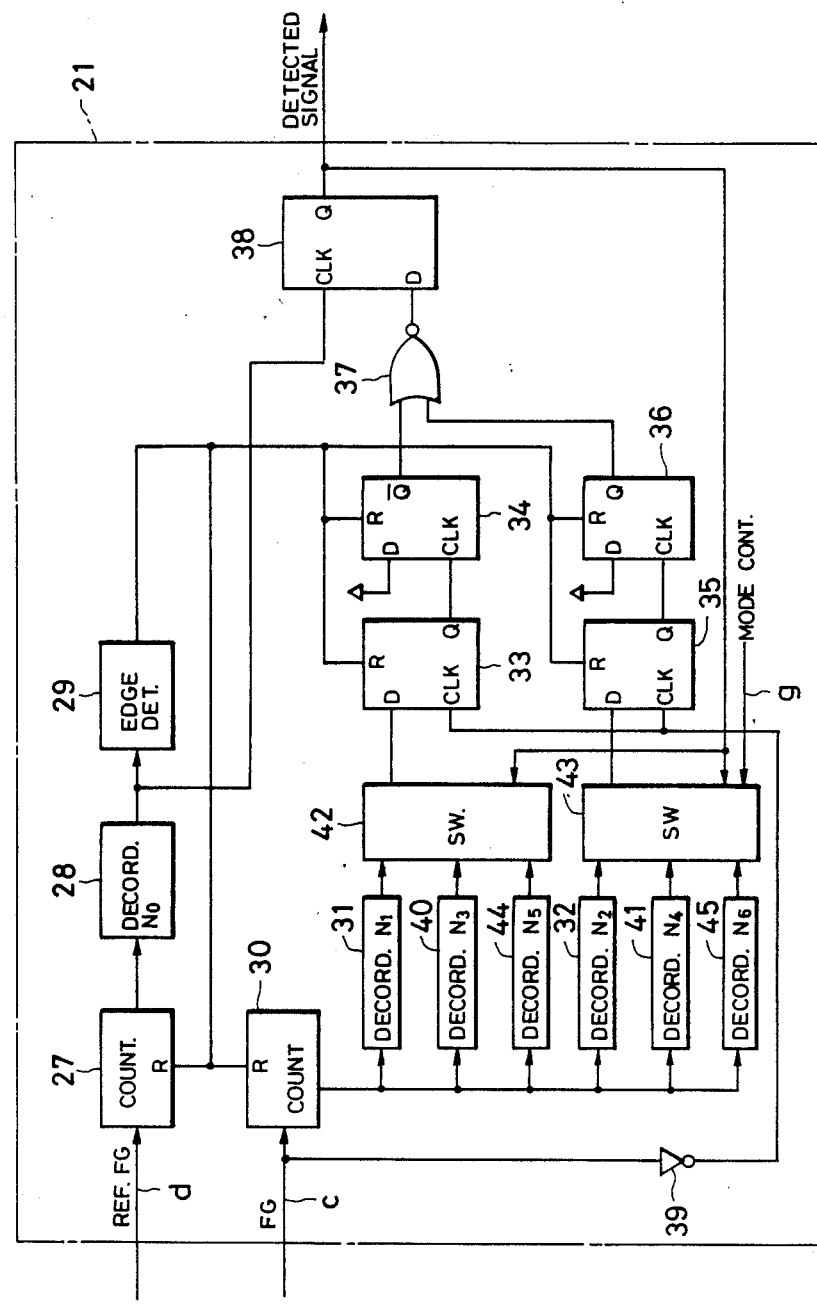
FIG. 6 is a block diagram of a further exemplary rotational frequency error detector in FIG. 1.

FIG. 6 is a block diagram of a further exemplary circuit configuration of the rotational frequency error detector 21 in FIG. 1, and FIG. 7 graphically shows the detection characteristic of the error detector 21 in FIG. 6.

The difference from the aforementioned example of FIG. 4 resides in that decoders 44 and 45 are additionally provided and the detection range is switched from C1 to C3, which is wider than C1, by a reproduction mode control (MODE CONTROL) signal (g) obtained from an unshown system control circuit.

If the above switching action is executed particularly in a scan reproduction mode to perform fast reproduction by intermittently fast-forwarding the pickup 3, the control range in the H. Sync servo mode is widened so that, despite generation of some signal dropout due to such intermittent fast-forward motion, it becomes possible to avert immediate switching to the FG servo mode, whereby stable reproduced picture can be outputted without any malfunction that may otherwise be caused by the signal dropout.

It is to be understood that the rotational frequency error detector 21 and the frequency error detectors 22, 23 shown in FIG. 1 are not limited to the above examples alone and may be composed of some other circuits having the same function. Similarly the respective detection characteristics of such circuits are not limited to the aforementioned ones either.

The description given in this embodiment is concerned with an exemplary case of directly using the FG signal (c) obtained from the rpm detector 16. However, the signal is not limited to the above alone and may be demultiplied, for example, by the frequency divider 17' shown in FIG. 1.

In the first and second embodiments, the division ratio N of the frequency divider 17' may take any value, and particularly in a case where the value N is set to be equal to the number of pulses of the FG signal (c) during one rotation of the disc motor 1, the input signal to the period measuring circuit 17 is fed at a rate of one pulse per rotation of the disc motor 1. In this case, the period of the input signal to the period measuring circuit 17 is independent on the precision of the rpm detector 16, whereby an advantage is ensured that the rpm of the disc motor 1 can be measured with a high accuracy.

Describing the above feature in further detail, in an exemplary constitution where the rpm detector 16 produces ten pulses of the FG signal (c) during one rotation (360°) of the disc motor 1, actually the pulses are not outputted exactly at a rate of one per 36° and, depending on the mechanical precision of the detector 16, the rate may be one pulse per 30° in an angular section or one pulse per 40° in another angular section. It follows therefore that, even if the rotational frequency of the disc motor 1 is maintained constant, the period of the FG signal (c) is still varied. However, with regard merely to the first one of ten pulses outputted from the detector 16 during one rotation of the motor 1, the period of the first pulse alone outputted once per rotation is rendered fixed if the rotational frequency of the disc motor 1 is maintained constant. Accordingly, in case the division ratio N of the frequency divider 17' is set to be equal to the number (ten in this example) of pulses during one rotation of the disc motor 1 as mentioned above, a signal is produced in such a manner that one pulse is outputted per rotation of the disc motor 1, so that the signal period is rendered coincident with the rotational frequency or rpm of the disc motor 1 at a ratio of 1:1.

In the embodiment described, the rotational frequency of the motor 1 is measured from the period of the output signal of the rpm detector 16. However, a similar result is attainable by measuring the signal frequency instead of the period, and the requisite is to measure the factor corresponding to the rpm of the motor 1.

Further in the above embodiment, the memory circuit 18 is not limited to a single memory alone and may be constituted of plural memories, of which one may be selected by the signal obtained from the system control logic circuit.

For example, in the circuit 18 composed of three memories, the output data from the aforementioned period measuring circuit 17 is stored in the first memory, while the data outputted from the control logic circuit is stored in the second memory, and the data corresponding to a predetermined rotational frequency is stored permanently in the third memory.

In an exemplary case, the data corresponding to the rotational frequency of the disc 1 at the start of reproduction is outputted from the control logic circuit and is stored in the second memory by the memory control circuit 20, or such data is previously stored in the third memory. Then, by selecting either the second or third memory at the start of reproduction, it is rendered possible to shorten the time required for obtaining a normal signal with increase of the rotational frequency of the motor 1 to a desired value after the start of reproduction. Furthermore, at a random access, the data corresponding to the rotational frequency in a target track is outputted from the control logic circuit and is stored in the second memory by the memory control circuit 20. Then the time required for the random access can be shortened by selecting the second memory and adjusting the rotational frequency of the disc motor 1 during the motion of the pickup 3.

Although the description given in the above embodiment is concerned with an exemplary case of using the present invention as a motor rotation control apparatus for a video disc player, it is a matter of course that the present invention is applicable also to a digital audio disc player or the like.

According to the present invention, even when stable information of the rotation or stable reproduced synchronizing signal fails to be obtained from the disc, it is still possible, as described hereinabove, to continuously achieve proper rotation of the motor without causing any great variation in the rotation rate of the motor or runaway thereof.

Furthermore, according to the present invention where the data of the frequency proportional to the rpm of the motor is stored in the memory circuit, if a stable reproduced synchronizing signal fails to be obtained in reproduction of a CLV disc, the desired motor rpm (conforming to the position of the reproducing pickup) can be attained immediately from the data stored in the memory circuit, thereby raising no problem with regard to both the cost and the durability.

In addition, because of the advantage of constituting the entire apparatus by digital circuits, it is adapted to be formed into an LSI complex to consequently retain the control precision high.

Besides the above, in the arrangement so contrived as to switch the characteristics of the frequency error detector and the rotational frequency error detector in accordance with the reproduction mode, it becomes possible to perform stable reproduction without causing malfunction despite any signal dropout induced in the reproduction mode (e.g. signal dropout due to intermittent forward motion of the pickup in the fast or scan reproduction mode).

We claim:

1. An apparatus for controlling the rotation of a motor to rotate a recording medium where an information signal and synchronizing signal are recorded, comprising:

means for reproducing the information signal and the synchronizing signal recorded on said recording medium;

synchronizing signal separating means connected to said reproducing means for separating the synchronizing signal from the reproduced signal;

means for generating a reference synchronizing signal;

means for generating a phase error signal by phase-comparing the synchronizing signal from said separating means with the reference synchronizing signal from said signal generating means;

means for controlling the rotation of the motor in such a manner as to eliminate the phase error in accordance with the phase error signal obtained from said phase error signal generating means;

means for detecting the rpm or rotational frequency of said motor;

memory means for sequentially storing the data relative to the rotational frequency obtained from said detecting means;

means for generating a reference frequency signal on the basis of the rotational frequency data stored in said memory means; and first detecting means for detecting the phase error between the synchronizing signal separated by said synchronizing signal separating means and the reference synchronizing signal generated from said reference synchronizing signal generating means;

wherein, when said phase error is greater than a predetermined value on the basis of the output signal of said first detecting means, the rotational frequency detected by said rpm detecting means is phase-compared with the reference frequency signal produced from said reference frequency signal generating means, and the phase error signal thus obtained is fed to said motor rotation control means to control the rotation of said motor.

2. The apparatus according to claim 1, further comprising second detecting means for detecting the phase error between the rotational frequency detected by said rpm detecting means and the reference frequency signal produced from said reference frequency signal generating means, wherein, when the two phase errors obtained from said first and second detecting means have exceeded predetermined values respectively, the motor rotation control mode based on the reproduced synchronizing signal is switched to another motor rotation control mode based on the detected rotational frequency.

3. The apparatus according to claim 2, wherein a predetermined detection reference value C in said second detecting means is greater than a predetermined detection reference value B in said first detecting means.

4. The apparatus according to claim 2, wherein a predetermined detection reference value C in said second detecting means is set to a first value C1 when switching the operation from one motor rotation control mode based on the reproduced synchronizing signal to another motor rotation control mode based on the detected rotational frequency, or to a second value C2 when switching the operation reversely from another motor rotation control mode to one motor rotation control mode.

5. The apparatus according to claim 4, wherein a third predetermined value C3 greater than said predetermined values C1 and C2 is set and, when the detected error is above said third predetermined value C3 in a special reproduction mode, the operation is switched from one motor rotation control mode based on the reproduced synchronizing signal to another motor rotation control mode based on the detected rotational frequency.

6. The apparatus according to claim 1, further comprising another detecting means for detecting the phase error between the synchronizing signal separated by said synchronizing signal separating means and the reference synchronizing signal generated from said reference synchronizing signal generating means, wherein, when the detected phase error is greater than a predetermined value, sequential storage of the data relative to the rotational frequency in said memory means is halted so that the preceding stored value is retained.

7. The apparatus according to claim 6, wherein a predetermined detection reference value A in said another detecting means is smaller than a predetermined detection reference value B in said first detecting means.

8. The apparatus according to claim 1, further comprising a frequency divider disposed between said rotational frequency detecting means and said memory means, wherein the rotational frequency signal demultiplied by said frequency divider is sequentially stored in said memory means.

9. The apparatus according to claim 8, wherein the division ratio of said frequency divider is equal to the ratio at which one pulse signal is outputted from said rotational frequency detecting means per rotation of said motor.

10. The apparatus according to claim 1, further comprising variable delay means disposed between said reproducing means and said synchronizing signal separating means, wherein the phase error signal obtained from said phase error signal generating means is supplied to said variable delay means so as to control the amount of delay of the reproduced signal inputted to said variable delay means.

11. The apparatus according to claim 10, wherein supply of the phase error signal to said variable delay means is halted when the operation is in the motor rotation control mode based on the detected rotational frequency.

12. The apparatus according to claim 1, further comprising second memory means, wherein a predetermined value is stored in said second memory means and, at the start of reproduction, the rotation of said motor is controlled in accordance with said predetermined value.

13. An apparatus for controlling the rotation of a motor to rotate a recording medium wherein an information signal and synchronizing signal are recorded, comprising:

means for reproducing the information signal and the synchronizing signal recorded on the recording medium;

synchronizing signal separating means connected to the reproducing means for separating the synchronizing signal from the reproduced signal;

means for generating a reference synchronizing signal;

means for generating a phase error signal by phase-comparing the synchronizing signal from the synchronizing signal separating means with the reference synchronizing signal from the signal generating means;

means for controlling rotation of the motor in such a manner as to eliminate the phase error in accordance with the phase error signal obtained from the phase error signal generating means;

means for detecting an output indicative of rotational frequency of the motor;

memory means for sequentially storing data relative to the rotational frequency obtained from the detecting means;

means for generating a reference frequency signal on the basis of the rotation frequency data stored in the memory means;

first detection means for detecting the phase error between the synchronizing signals separated by the synchronizing signal separating means and the reference synchronizing signal generated from the reference synchronizing signal generating means; and another detection means for detecting the phase error between the synchronizing signal separated by the synchronizing signal separating means and the reference synchronizing signal generated from the reference synchronizing signal generating means;

wherein when the phase error is greater than the predetermined value on the basis of the output signal of the first detection means, the rotational frequency detected by the rotational frequency detecting means is phase-compared with the reference frequency signal produced from the reference frequency signal generating means, and the phase error signal thus obtained is fed to the motor rotation control means to control the rotation of the motor, and when the detected phase error detected by the another detection means is greater than a predetermined value, sequential storage of the data relative to the rotational frequency in the memory means is halted so that the preceding storage value is retained.

14. The apparatus according to claim 13, wherein a predetermined detection reference value A in the another detection means is smaller than a predetermined detection reference value B in the first detection means.

15. The apparatus according to claim 13, further comprising second detection means for detecting the phase error between the rotational frequency detected by the rotational frequency detecting means and the reference frequency signal produced from the reference frequency signal generating means, a predetermined detection reference value C in the second detection means being set to a first value C1 when the switching the operation from one motor rotation control mode based on the produced synchronizing signal to another motor rotation control mode based on the detected rotational frequency, or to a second value C2 when switching the operation reversely from the another motor rotational control mode to the one motor rotational control mode.

16. The apparatus according to claim 15, wherein a third predetermined value C3 greater than the predetermined values C1 and C2 is set and, when the detected error is above the third predetermined value C3 in a special reproduction mode, the operation is switched from the one motor rotation control mode based on the reproduced synchronizing signal to the another motor rotation control mode based upon the detected rotational frequency.

17. An apparatus for controlling the rotation of a motor to rotate a recording medium where an information signal synchronizing signal are recorded, comprising:
means for reproducing the information signal and the synchronizing signal recorded on the recording medium;
synchronizing signal separating means connected to the reproducing means for separating the synchronizing signal from the reproduced signal;
means for generating a reference synchronizing signal;
means for generating a phase error signal by phase-comparing the synchronizing signal from the separating means with the reference synchronizing signal from the signal generating means;
means for controlling the rotation of the motor in such a manner as to eliminate the phase error in accordance with the phase error signal obtained from the phase error signal generating means;
means for detecting an output indicative of rotational frequency of the motor;
memory means for sequentially storing data relative to the rotational frequency obtained from the detecting means;
means for generating a reference frequency signal on the basis of the rotational frequency data stored in the memory means;
first detection means for detecting the phase error between the synchronizing signal separated by the synchronizing signal separating means and the reference synchronizing signal generated from the reference synchronizing signal generating means; and
a frequency divider disposed between the rotational frequency detecting means and the memory means;
wherein the rotational frequency signal demultiplied by the frequency divider is sequentially stored in the memory means, and when the phase error is greater than a predetermined value on the basis of the output signal of the first detection means, the rotational frequency detected by the rotational frequency detecting means is phase-compared with the reference frequency signal produced from the reference frequency signal generating means, and the phase error signal thus obtained is fed to the motor rotation control means to control the rotation of the motor.

18. The apparatus according to claim 17, wherein the division ratio of the frequency divider is equal to the ratio at which one pulse signal is outputted from the rotational frequency detecting means per rotation of the motor.

19. The apparatus according to claim 17, further comprising second detection means for detecting the phase error between the rotational frequency detected by the rotation frequency detecting means and the reference frequency signal produced from the reference frequency signal generating means, a predetermined detection reference value C in the second detection means being set to a first value C1 when switching the operation from one motor rotation control mode based on the produced synchronizing signal to another motor rotation control mode based on the detected rotational frequency, or to a second value C2 when switching the operation reversely from the another motor rotational control mode to the one motor rotational control mode.

20. The apparatus according to claim 19, wherein a third predetermined value C3 greater than the predetermined value C1 and C2 is set and, when the detected error is above the third predetermined value C3 in a special reproduction mode, the operation is switched from the one motor rotation control mode based on the reproduced synchronizing signal to the another motor rotation control mode based upon the detected rotational frequency.

* * * * *